United States Patent [19]

Nicksic

[11] 4,290,284
[45] Sep. 22, 1981

[54] LOCKING DEVICE FOR SPOKED WHEEL VEHICLES

[76] Inventor: Edward E. Nicksic, 1318 W. Oregon, Phoenix, Ariz. 85013

[21] Appl. No.: 142,262

[22] Filed: Apr. 21, 1980

[51] Int. Cl.³ .................. B62H 5/16; B62K 25/02; E05B 71/00; F16B 41/00
[52] U.S. Cl. .................................. 70/233; 70/227; 70/230; 70/232; 70/DIG. 57; 280/289 L
[58] Field of Search .............. 70/233, 230, 229, 227, 70/226, 236, 259, 232; 280/289 L

[56] References Cited

U.S. PATENT DOCUMENTS

| 1,197,937 | 9/1916 | Jackson | 70/227 X |
| 1,270,088 | 6/1918 | Adreon | 70/232 X |
| 1,285,093 | 11/1918 | Fishel | 70/232 X |
| 2,846,257 | 8/1958 | Sherrill | 70/232 X |
| 3,563,070 | 2/1971 | Earl | 70/232 |
| 3,672,190 | 6/1972 | Palazzolo | 70/232 X |
| 4,028,915 | 6/1977 | Stahl | 70/233 |
| 4,114,409 | 9/1978 | Scire | 70/225 |

FOREIGN PATENT DOCUMENTS

| 351766 | 4/1922 | Fed. Rep. of Germany | 70/227 |
| 320443 | 8/1934 | Italy | 70/227 |
| 437170 | 10/1935 | United Kingdom | 70/227 |
| 578659 | 7/1946 | United Kingdom | 70/227 |

Primary Examiner—Roy D. Frazier
Assistant Examiner—Carl F. Pietruszka
Attorney, Agent, or Firm—Cahill, Sutton & Thomas

[57] ABSTRACT

A locking device for use in conjunction with spoked wheel vehicles includes a hasp having first and second hinged members. The first member includes an outwardly projecting staple, and the second member includes a corresponding slot which passes over the staple when the second member is folded against the first member in the locked position. A threaded nut is rigidly attached to a plate, and the threaded nut is spun onto an end of a threaded wheel axle which supports the spoked wheel. The first member of the hasp is attached to the plate and to the vehicle frame by a clamping bracket engaged by screws inserted through holes within the first member and through slots within the plate. The hasp also includes a pair of flanges extending perpendicularly from opposite edges of the second member. When the second member of the hasp is closed over the first member in the locked position, the flanges extend beyond the first member and plate and project between the spokes of the spoked wheel for immobilizing it. The heads of the screws which engage the clamping bracket are inaccessible when the second member of the hasp is folded over the first member. The shackle of a padlock may be passed through the staple of the hasp for maintaining the locking device in its locked position.

11 Claims, 5 Drawing Figures

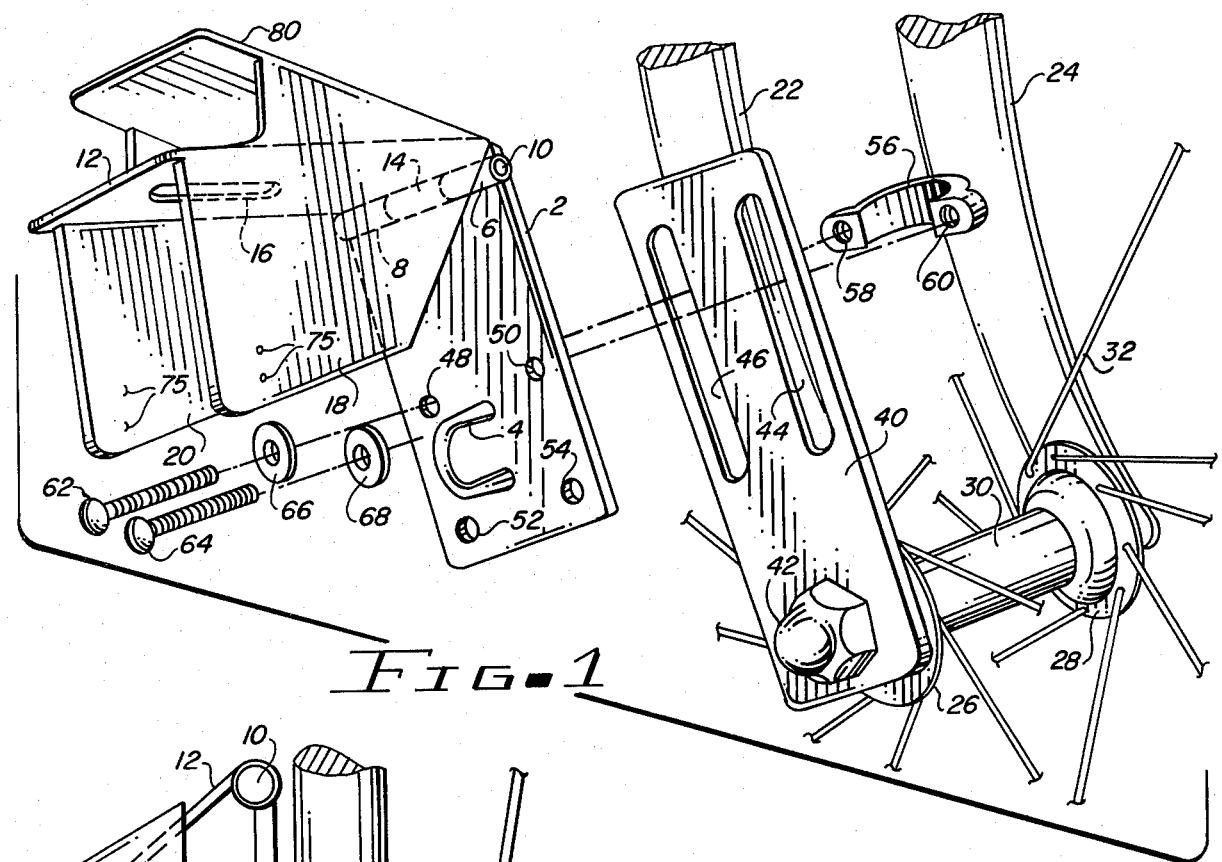
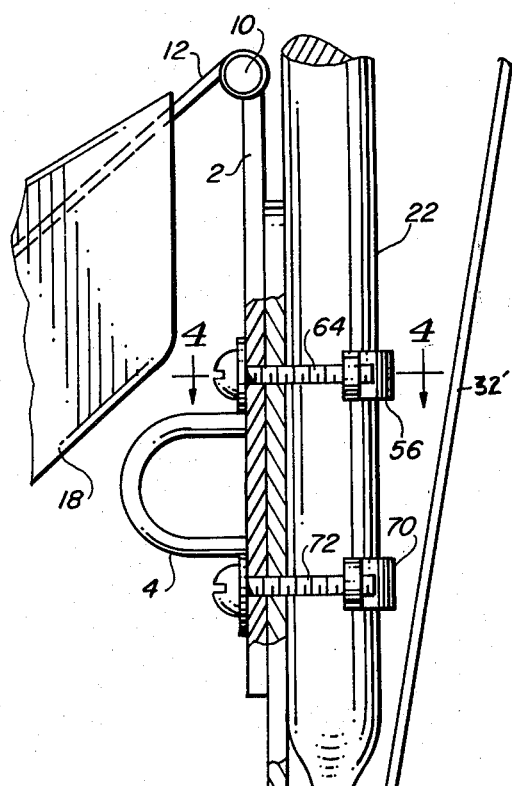
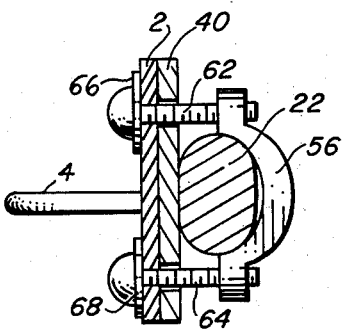

LOCKING DEVICE FOR SPOKED WHEEL VEHICLES

BACKGROUND OF THE INVENTION

1. Field of the Invention

The present invention relates generally to locking devices used in conjunction with spoked wheel vehicles such as bicycles, and more particularly, to a locking device which immobilizes a spoked wheel and prevents removal of the spoked wheel from the vehicle.

2. Description of the Prior Art

Locking devices for use in conjunction with bicycles, and particularly locking devices which are mounted to the front fork of a bicycle and which can be extended into the path of the spokes of the front wheel, are well known in the art. However, prior art locking devices of this type typically may be easily circumvented. Often, such locking devices are attached to the front fork of the bicycle in a manner which allows a thief to simply twist the locking device out of the path of the spokes. In the case of other prior art locking devices, a thief may simply loosen the axle nuts which attach the front wheel to the fork and detach the front wheel from the front fork. The thief may then slide the locking device down along the front fork of the bicycle and remove it as well. The thief may then reattach the front wheel to the front fork and ride off on the bicycle.

The majority of prior art locking devices for spoked wheel vehicles include a self-contained keyed locking cylinder which increases the cost and complexity of such devices. Also, such prior art locking devices immobilize the wheel but typically lack a means for engaging a chain or cable used to secure the bicycle to a stationary object such as a bicycle rack or post. Consequently, the bicycle owner must carry a separate padlock if it is desired to chain the bicycle to the stationary object. Often, the chain or cable is passed through the front wheel and around the stationary object. However, in this instance, a thief may merely loosen the front axle nuts and steal all but the front wheel of the bicycle. Similarly, if the chain or cable is passed through the bicycle frame, a thief may loosen the axle nuts and steal the front wheel.

Locking nut assemblies which prevent untightening of axle nuts are also known in the art. For example, U.S. Pat. No. 4,057,985 discloses a locking nut assembly for preventing the removal of axle nuts from bicycle wheels. However, locking nut assemblies of the type disclosed in the above mentioned United States patent require a special locking mechanism having spring loaded pins for engaging grooves in a locking bore of a specially designed axle nut in order to lock a cover over the axle nut. The locking mechanism includes a keyed cylinder which adds to the expense and complexity of the device. In addition, the cover may be crushed, allowing rotation of the axle nut via rotation of the cover. Also, such locking nut assemblies do not immobilize the wheel and therefore do not prevent an unauthorized person from operating the bicycle.

Accordingly, it is an object of the present invention to provide a locking device for spoked wheel vehicles which can be extended through the spokes of a wheel to immobilize the wheel.

Another object of the present invention is to provide a locking device which can be extended through the spokes of a spoked wheel and which may not be easily twisted out of the path of the spokes or slid off of the frame of the vehicle, the locking device thereby being substantially tamper-proof.

Still another object of the present invention is to provide a locking device for spoked wheel vehicles which prevents unauthorized persons from removing a wheel from the vehicle.

A further object of the present invention is to provide a locking device for a spoked wheel vehicle which is inexpensive and easy to construct.

A yet further object of the present invention is to provide a locking device for a spoked wheel vehicle which is adapted to be easily installed on a wide variety of such vehicles and which is easily operated by a user.

Still another object of the present invention is to provide a locking device for a spoked wheel vehicle which may be used in conjunction with a conventional chain or cable and a padlock for simultaneously securing both the spoked wheel and the vehicle frame to a stationary object.

SUMMARY OF THE INVENTION

Briefly described, and in accordance with one embodiment thereof, the present invention relates to a locking device for spoked wheel vehicles, the locking device including a hasp having first and second members hinged to each other. The first member includes an outwardly projecting staple which is adapted to receive the shackle of a conventional padlock. The second member includes a slot positioned opposite the staple for allowing the staple to project through the second member when it is folded against the first member. The locking device also includes a threaded nut secured to a plate or third member having a hole concentric with the bore of the threaded nut. The threaded nut is threaded over the axle upon which the spoked wheel is rotatably mounted, and the plate is tightened against the conventional axle nut for preventing detachment of the axle from the frame of the vehicle. The plate is positioned to extend adjacent the frame of the vehicle, and the first member of the hasp is attached to the plate and to the frame of the vehicle by one or more clamping brackets engaged by screws inserted through the first member and the plate. The heads of the screws are covered by the second member of the hasp when the second member is folded over the first member. The second member of the hasp has one or more flanges attached thereto which extend through the spokes of the spoked wheel when the second member of the hasp is folded over the first member. The second member of the hasp may also include a cover which overlies the staple when the hasp is closed in order to restrict access to the shackle of a padlock inserted through the staple. The flanges attached to the second member of the hasp may each include protuberances which contact an edge of the first member of the hasp for retaining the hasp in an open position and thereby keeping the flanges out of the path of the spokes when the vehicle is being operated.

BRIEF DESCRIPTION OF THE DRAWINGS

FIG. 1 is an exploded perspective view of a locking device for a spoked wheel vehicle and a partial perspective view of a front fork and front wheel of a bicycle.

FIG. 2 is a side view of the locking device shown in FIG. 1 in an unlocked position for allowing the spoked wheel to rotate.

FIG. 4 is a cross-sectional top view taken through the plane indicated by lines 4—4 in FIG. 2.

DESCRIPTION OF THE PREFERRED EMBODIMENT

Figure 3:
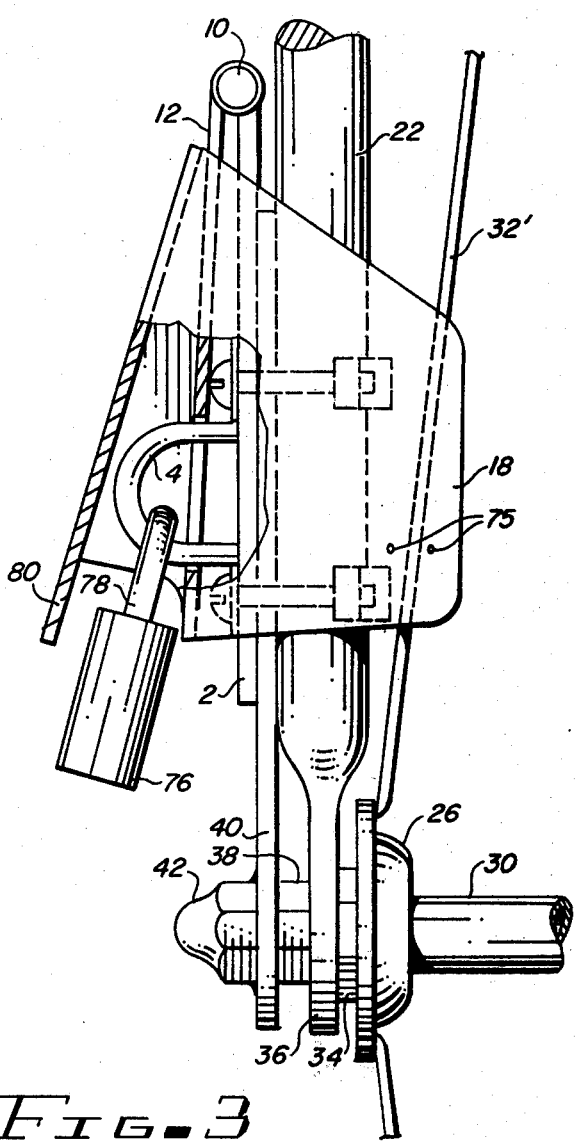
FIG. 3 is a side view of the locking device shown in FIG. 1 in the locked position for immobilizing the spoked wheel.

FIGS. 1–4 illustrate a locking device as used in conjunction with a bicycle. Although the description below relates to the use of the locking device in conjunction with the front wheel of a bicycle, it should be clear from the description that the locking device may be used equally as well in conjunction with the rear wheel of a bicycle or other spoked wheeled vehicle. The bicycle locking device includes a hasp having a first member 2. A staple 4 projects from one side of first member 2, the staple being of sufficient size to easily permit the passage of a shackle of a padlock therethrough. One end of first member 2 includes curled cylindrical portions 6 and 8 for encircling a hinge pin 10. The hasp also includes a second member 12 also having a curled cylindrical portion 14 at one of its ends for encircling hinge pin 10 whereby first member 2 and second member 12 are hinged to each other. Second member 12 includes a slotted aperture 16 disposed opposite staple 4 for allowing the passage of staple 4 through second member 12 when it is folded over first member 2.

A first flange 18 and a second flange 20 are attached to opposite edges of second member 12 and extend perpendicularly therefrom. The distance between first flange 18 and second flange 20 is slightly greater than the width of first member 2 for allowing flanges 18 and 20 to project beyond first member 2 when the hasp is closed, i.e., when second member 12 is folded down over first member 2.

Also shown in FIGS. 1–3 is a portion of the front fork and front wheel of a bicycle. The front fork includes downwardly projecting frame members 22 and 24. The front wheel assembly includes first and second wheel hubs 26 and 28 connected by a cylindrical tube 30. As shown in the cutaway portion of FIG. 2, the wheel assembly is supported by a threaded axle 31 which extends through connecting tube 30 and beyond hubs 26 and 28. The wheel rim (not shown) is connected to wheel hubs 26 and 28 by a plurality of spokes 32, 32'. A ball bearing retaining nut 34 is threaded onto axle 31, and ball bearings (not shown) disposed within the race formed between retaining nut 34 and hub 26 allow the wheel assembly to freely rotate, as is well known in the art.

As shown in FIGS. 2 and 3, the lower portion of frame member 22 includes a slotted flange 36 for engaging threaded axle 31. The wheel assembly is retained within the bicycle frame by an axle nut 38 which is threaded over axle 31 and tightened against flange 36. A similar axle nut (not shown) is used in conjunction with the other side of the wheel assembly.

In order to attach the locking device hasp to the bicycle frame, a third member or plate 40 is provided. Plate 40 has a hole formed at one end, the diameter of the hole being slightly larger than the diameter of threaded axle 31. A threaded nut 42 is rigidly attached, as by welding, to one side of plate 40, the threaded nut having a bore concentric with the hole formed in the lower end of plate 40. As shown in FIGS. 1–3, threaded nut 42 may be a cap nut, although conventional nuts may also be used. In order to install plate 40, the hole within the lower end of plate 40 is aligned with the end of threaded axle 31 adjacent axle nut 38, and plate 40 is spun or rotated for threading nut 42 over axle 31. Plate 40 is tightened against axle nut 38 for preventing axle nut 38 from being loosened and thereby preventing the removal of the wheel assembly from the bicycle frame. After plate 40 is sufficiently tightened against axle nut 38, plate 40 is rotated until it extends adjacent frame member 22.

As shown in FIG. 1, plate 40 includes slotted regions 44 and 46 at the end of plate 40 opposite nut 42. Slotted regions 44 and 46 extend parallel to each other. The distance between slotted regions 44 and 46 is greater than the largest cross-sectional dimension of frame member 22 in order that frame member 22 does not interfere with the insertion of screws through slotted regions 44 or 46.

In order to attach the locking device hasp to plate 40 and bicycle frame 22, holes 48, 50, 52 and 54 are formed within first member 2. The distance between holes 48 and 50 and the distance between holes 52 and 54 is the same as the distance between slotted regions 44 and 46 of plate 40. As shown best in FIGS. 1 and 4, a clamping bracket 56 having a generally concave clamping surface is positioned behind frame member 22. Threaded holes 58 and 60 are formed at the ends of clamping bracket 56 for threadedly engaging the shafts of screws 62 and 64. Washers 66 and 68, which may be lock washers, are inserted between the heads of screws 62 and 64 and first member 2. Screw 62 passes through hole 48 within first member 2 and passes through slot 46 within plate 40 for engaging threaded hole 58 within bracket 56. Similarly, screw 64 passes through hole 50 and through slot 44 and engages threaded hole 60. Screws 62 and 64 are sufficiently tightened to clamp first member 2 against plate 40 and to clamp plate 40 against frame member 22. As shown in FIGS. 2 and 3, a second clamping bracket 70 may be provided for engaging a screw 72 inserted through hole 54 and slot 44. Bracket 70 also engages another screw (not shown) inserted through hole 52 and slot 46. It will be apparent to those skilled in the art that the provision of slotted regions 44 and 46 within plate 40 allows for sliding attachment of plate 40 to first member 2 and for variation in the positioning of first member 2 and clamping brackets 56 and 70 along the frame member 22, thereby allowing the locking device to be used in conjunction with bicycles or other spoked wheels of a variety of makes and models.

In FIG. 2, the locking device of the present invention is shown in an unlocked position wherein the hasp is opened. In the unlocked position, flanges 18 and 20 do not interefere with the travel of spokes 32'. In addition, when the hasp of the locking device is open, the heads of clamping screws 62, 64, and 72 are readily accessible for removal of the locking device by the owner as may be necessitated by a flat tire or the like.

As will be described below, a padlock is utilized to maintain the locking device in its locked position. However, the padlock may also be applied to the locking device when the hasp is open, as by passing the shackle of the padlock through staple 4 whereby the user of the bicycle need not carry the padlock on his person during operation of the vehicle. In addition, a padlock thus installed prevents the hasp of the locking device from closing and thereby prevents flanges 18 and 20 from interfering with spokes 32'. However, as shown in FIGS. 1 and 3, protuberances 75 are formed in the inner surfaces of flanges 18 and 20, as by punching flanges 18 and 20 with a pointed instrument from the outer surface thereof. Protuberances 75 contact the edges of first member 2 as the hasp begins to close and retain the hasp in an open position unless sufficient force is supplied by the user to advance protuberances 75 upon flanges 18 and 20 past the edges of first member 2 to fully close the hasp. Therefore the locking device can be retained in its open or unlocked position even when a padlock is not applied thereto.

In FIG. 3, the locking device is shown in its locked position wherein second member 12 is folded over first member 2 and a padlock 76 has been applied to the locking device, the shackle 78 of the padlock 76 passing through staple 4 for preventing the hasp from being opened. As is apparent from FIG. 3, when the hasp is in its closed position, the heads of clamping screws 62, 64 and 72 are not accessible, and the locking device can not be removed. Also as shown in FIG. 3, flanges 18 and 20 extend between spokes 32', thereby immobilizing the wheel assembly. When thus locked, the locking device prevents removal of the wheel assembly since axle nut 38 may not be loosened. Also, the locking device may not be slid off of the frame of the vehicle since the locking device is secured to the axle of the wheel assembly. It is also extremely difficult to twist the locking device about the frame of the vehicle in order to avoid interference with the spokes.

As shown best in FIGS. 1 and 3, the hasp of the locking device may include a cover 80 attached to second member 12 and positioned to overlie staple 4 when the locking device is in its locked position, i.e., when the hasp is closed. Cover 80 is adapted to avoid interference with the insertion of shackle 78 of padlock 76 through staple 4 while significantly restricting access to the shackle of the padlock when thus installed. Cover 80 thereby prevents the application of cutting tools such as bolt cutters or hacksaws to shackle 78. Cover 80 and flanges 18 and 20 may all be formed from a single piece of sheet metal bent to proper shape and welded to second member 12 of the hasp.

The locking device of the present invention may also be used in conjunction with a chain for chaining the vehicle to a stationary object. The end links of the chain or cable may be passed through shackle 78 of padlock 76 before shackle 78 is passed through staple 4. When the chain or cable is utilized in this manner, both the frame and the wheel assembly of the vehicle are positively locked to the stationary object.

Figure 5:
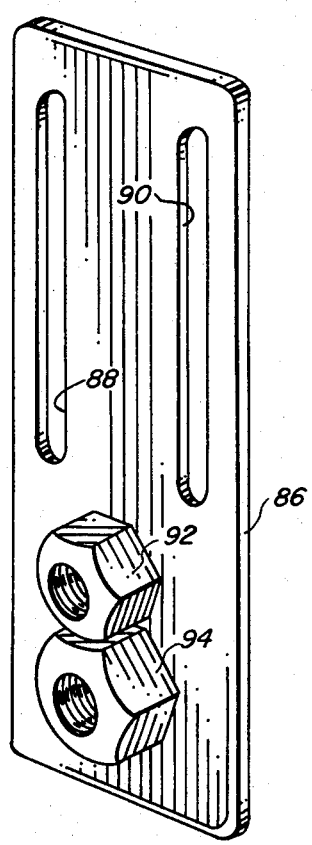
FIG. 5 is a perspective view of a portion of the locking device modified to be used in conjunction with wheel axles of different diameters.

In FIG. 5, a modified third member or plate 86 is shown which may be used in substitution for plate 40 shown in FIG. 1. Plate 86 includes slotted regions 88 and 90 along its upper portion similar to slotted regions 44 and 46 within plate 40. However, the lower portion of plate 86 has two holes formed therein, and two threaded nuts 92 and 94 are rigidly attached to plate 86, each of nuts 92 and 94 having a bore concentric with one of the holes within plate 86. Nuts 92 and 94 have threaded bores of different diameters for adapting the locking device to threaded wheel axles of different diameters. Some bicycles currently in use include front and rear threaded wheel axles of different diameters, and the provision of nuts 92 and 94 in conjunction with plate 86 allow the locking device to be installed adjacent either the front wheel or the rear wheel of the bicycle. Similarly, the provision of nuts 92 and 94 can allow the locking device to be used in conjunction with two different bicycles having different wheel axle diameters.

The components of the locking device described above are preferably made of a rugged metal such as steel. The thickness of the hasp members, flanges, and plate are selected to make the locking device reasonably strong yet light in weight.

It will now be appreciated that a locking device for a spoked wheel vehicle has been described which simultaneously prevents removal of the wheel assembly from the vehicle frame and which immobilizes the wheel. The locking device is of simple consturction, is inexpensive, and is easily installed and used. The locking device is used in conjunction with a standard padlock and may additionally be used in conjunction with a conventional chain or cable for locking the vehicle to a stationary object. While the invention has been described with reference to a preferred embodiment thereof, the description is for illustrative purposes only and is not to be construed as limiting the scope of the invention. Various modifications and changes may be made by those skilled in the art without departing from the true spirit and scope of the invention as defined by the appended claims.

I claim:

1. A locking device for locking a spoked wheel of a spoked wheel vehicle, the spoked wheel being rotatably mounted upon a threaded axle, the threaded axle being attached to a frame member of the vehicle, said locking device comprising in combination:
    a. a hasp including a first member having a staple projecting from one side thereof, said staple being formed to permit the passage of a shackle of a padlock therethrough, said hasp also including a second member hinged to said first member and having a slot located opposite said staple, said staple extending through said slot when said second member is folded over said first member;
    b. a first threaded nut attached to said first member for threadedly engaging the threaded axle upon which the spoked wheel is rotatably mounted and preventing detachment of the threaded axle from the frame member of the vehicle; and
    c. attaching means coupled to said first member for releasably attaching said first member to the frame member of the vehicle to prevent rotation of said threaded nut, access to said attaching means for effecting release of said first member from the frame member of the vehicle being prevented when said second member is folded over said first member.

2. A locking device as recited in claim 1 further including at least one flange attached to said second member, said flange passing beyond said first member and extending between the spokes of the spoked wheel when said second member is folded over said first member for preventing rotation of the spoked wheel.

3. A locking device as recited in claim 2 further including a cover attached to said second member and positioned to overlie said staple when said second member is folded over said first member, said cover allowing the shackle of a padlock to be inserted through said staple while restricting access to the inserted shackle of the padlock.

4. A locking device as recited in claim 2 wherein said first threaded nut is rigidly attached to a third member, and said third member is slidingly attached to said first member for varying the distance between said first threaded nut and said attaching means.

5. A locking device as recited in claim 4 wherein said third member has at least one slotted region engaged by said attaching means for slidingly attaching said third member to said first member.

6. A locking device as recited in claim 2 wherein said first threaded nut is a cap nut.

7. A locking device as recited in claim 2 further including a second threaded nut attached to said first member for threadedly engaging the threaded axle upon which the spoked wheel is rotatably mounted and preventing detachment of the threaded axle from the frame member of the vehicle, said second threaded nut being of a different size than said first threaded nut for allowing said locking device to be used in conjunction with threaded axis of different diameters.

8. A locking device as recited in claim 2 further comprising retaining means for retaining said second member away from said first member during operation of the vehicle to prevent said flange from interfering with the spokes of the spoked wheel.

9. A locking device as recited in claim 8 wherein said retaining means comprises at least one protuberance upon said flange, said protuberance contacting an edge of said first member for retaining said second member away from said first member.

10. A locking device as recited in claim 2 wherein the frame member of the vehicle includes a first side facing said first member and a second side opposite said first side, said attaching means comprising:
  a. a bracket for engaging the second side of the frame member, said bracket having a threaded region; and
  b. fastening means for threadedly engaging the threaded region of said bracket, said fastening means being installed on the side of said first member from which said staple projects, said fastening means being covered by said second member when said second member is folded over said first member.

11. A locking device as recited in claim 10 wherein said bracket includes at least one threaded hole and said fastening means comprises at least one screw having a shaft inserted through a hole in said first member for engaging the threaded hole of said bracket and having a head for turning the shaft of the screw, the head of the screw being covered by said second member when said second member is folded over said first member.

* * * * *